Aug. 23, 1960      E. THOMSON      2,949,716
HARVESTING MACHINE FOR ROW CROPS
Filed April 10, 1957      3 Sheets-Sheet 1
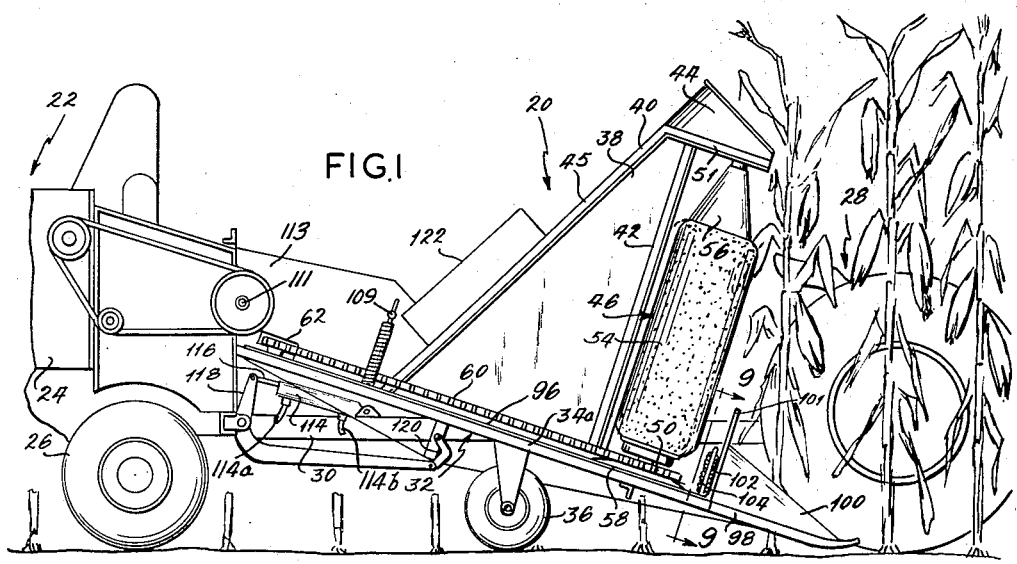
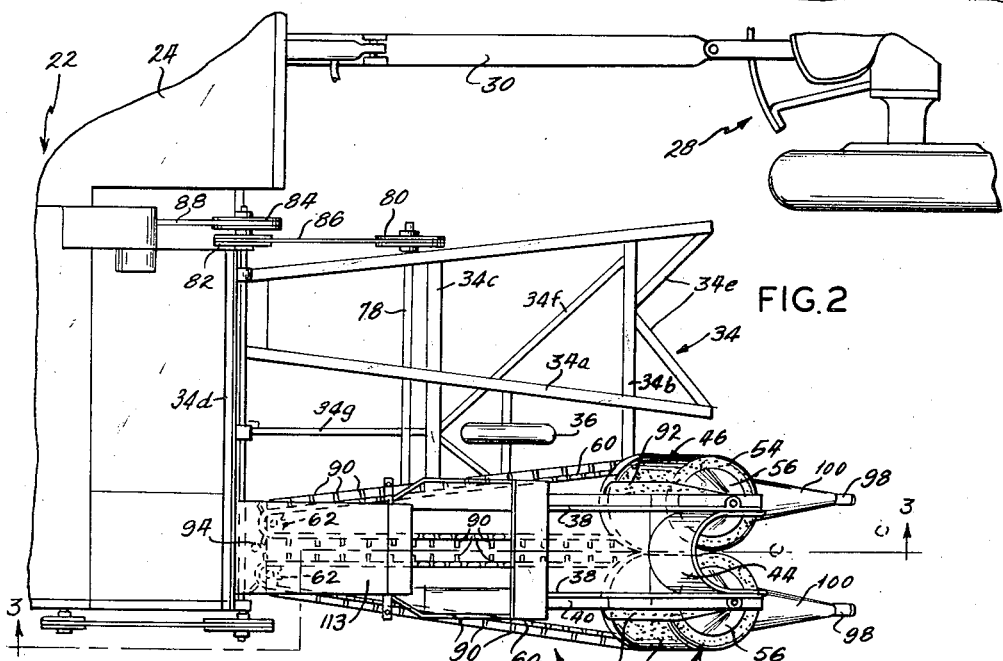
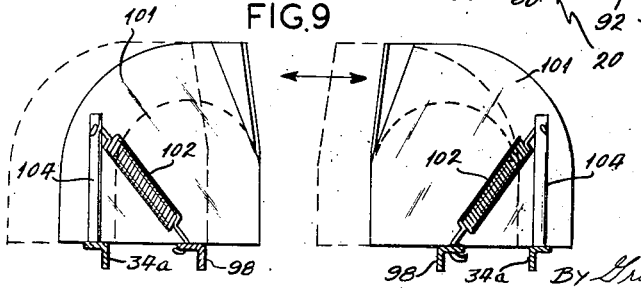
INVENTOR:
EDWARD THOMSON
By Gravely, Lieder, Woodruff and Wills
ATTORNEYS.

Aug. 23, 1960   E. THOMSON   2,949,716
HARVESTING MACHINE FOR ROW CROPS
Filed April 10, 1957   3 Sheets-Sheet 2
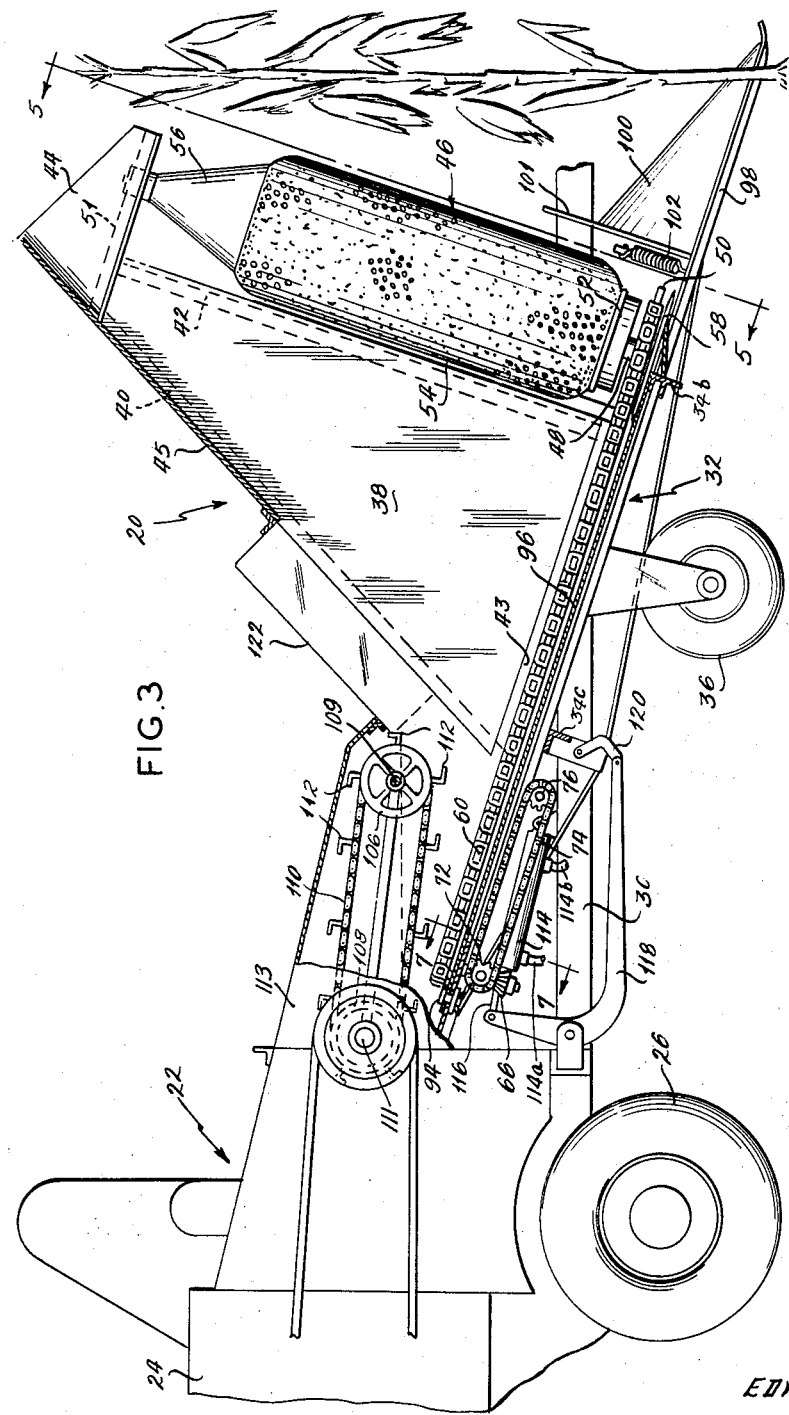
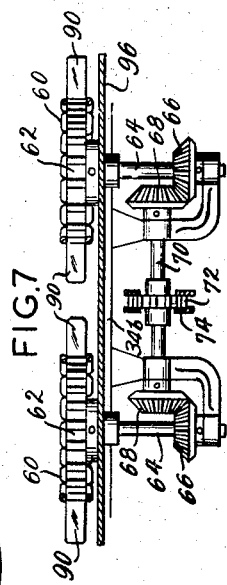
INVENTOR:
EDWARD THOMSON
By Gravely, Lieder, Woodruff and Welles
ATTORNEYS.

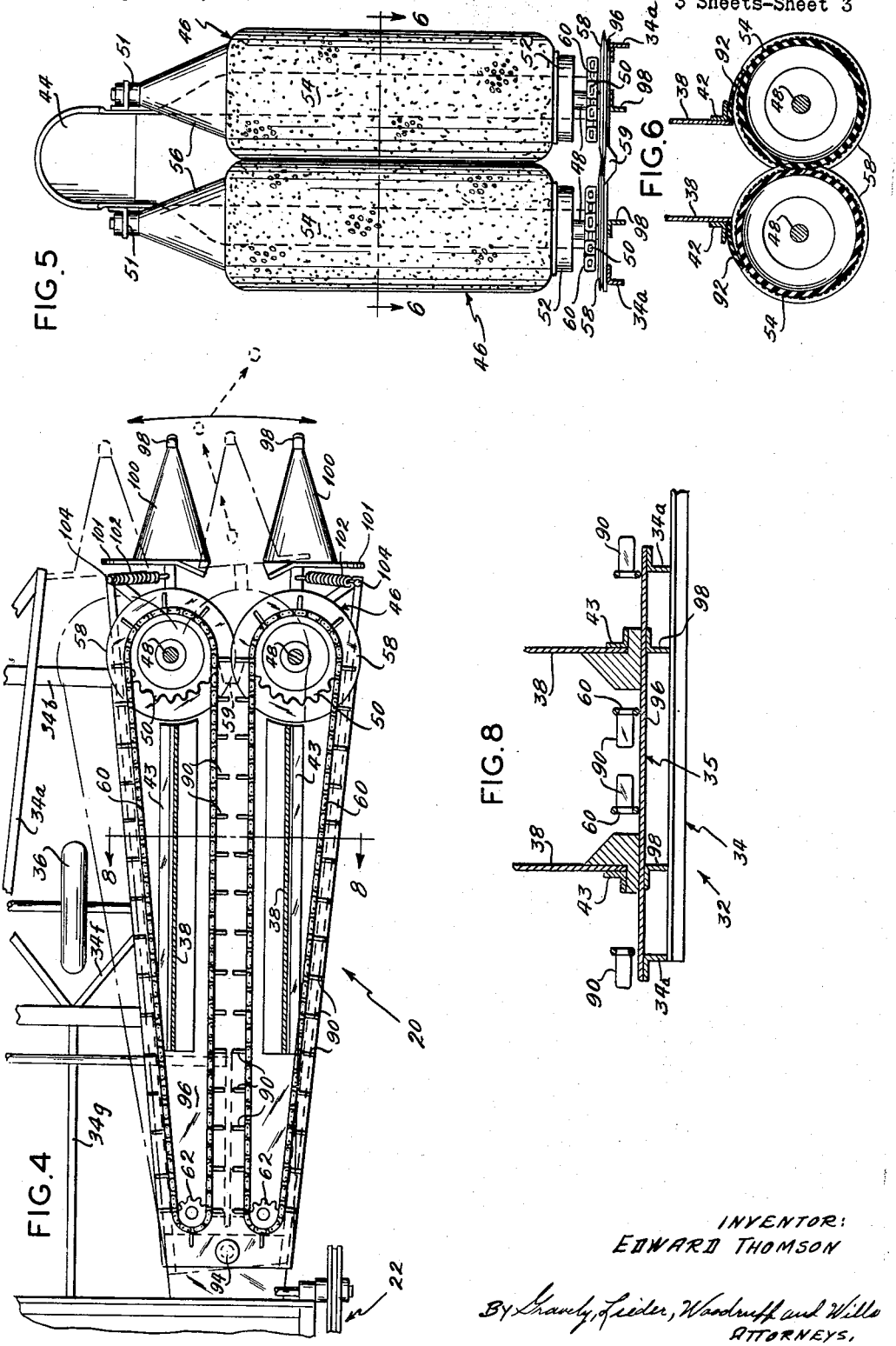

United States Patent Office 2,949,716
Patented Aug. 23, 1960

2,949,716

HARVESTING MACHINE FOR ROW CROPS

Edward Thomson, Fairfield Road, R.R. 7,
Mount Vernon, Ill.

Filed Apr. 10, 1957, Ser. No. 652,004

9 Claims. (Cl. 56—15)

The present invention relates to harvesting apparatus and more particularly to harvesting apparatus for gathering in and severing standing crop stalks from the ground as it moves along a standing crop row.

Various devices have heretofore been employed by farmers to aid them in harvesting row crops such as corn. These known devices have been relatively costly to construct and maintain, and have been relatively difficult to operate. Furthermore, the known harvesting devices have resulted in waste due to rough handling of the crop and have not been flexible enough to gather in crop stalks which are out of line in their rows.

It is, therefore, a major object of the present invention to provide a harvesting apparatus which eliminates waste caused by rough handling of the crop and by crop stalks being out of line in their rows.

Another object of the invention is to delay severing the stalks of row crops until the stalks are held by the harvesting machine.

Another object of the present invention is to sever the stalks of row crops near the ground.

Another object of the invention is to provide harvesting apparatus which is adaptable for manufacturing as a complete apparatus unto itself, but which is also readily adaptable to manufacture as an attachment for use with existing equipment.

Another object of the present invention is to provide harvesting apparatus for corn and other row crops which is simple and inexpensive to construct and maintain.

Another object of the invention is to provide harvesting apparatus for row crops which centers itself on the crop stalks and which holds the stalks while the stalks are severed at or near the ground.

Still another object of this invention is to provide harvesting apparatus of the type described which is adaptable to being constructed in tandem for harvesting more than one row at a time.

Other objects and advantages for the present invention will be apparent after considering the following detailed specification in conjunction with the accompanying drawings.

In the drawings:

Fig. 1 is a side elevational view of the harvesting apparatus constituting the present invention, the novel apparatus being shown attached to a piece of farm machinery shown in fragmentary detail only, Fig. 2 is a fragmentary top plan view of the apparatus shown in Fig. 1, Fig. 3 is an enlarged cross-sectional elevational view of the apparatus, taken along line 3—3 in Fig. 2, Fig. 4 is an enlarged fragmentary top plan view of the apparatus, partly in section, and with parts removed for purposes of clarity illustrating in phantom outline how the apparatus adjusts its position to handle crop stalks that are out of line in their row, Fig. 5 is a front sectional view of the apparatus taken along the line 5—5 in Fig. 3, Fig. 6 is a cross-sectional view taken along line 6—6 in Fig. 5, Fig. 7 is an enlarged fragmentary cross-sectional view of the apparatus taken along line 7—7 in Fig. 3, Fig. 8 is an enlarged fragmentary cross-sectional elevational view taken along line 8—8 in Fig. 4, and Fig. 9 is an enlarged cross-sectional elevational view taken along line 9—9 in Fig. 1.

Referring to the drawings more in detail, the number 20 in Figs. 1, 2, 3, and 4 refers to a harvesting machine which is constructed according to the teachings of the present invention. In the drawings, the machine 20 is shown for illustrative purposes attached to the front end of a harvesting vehicle 22 which includes body portion 24 supported for movement on wheels 26 only one of which is shown in Figs. 1 and 3. The harvesting vehicle 22, including the machine 20, is towed by a tractor 28 connected thereto by rod 30 (Figs. 1, 2, and 3). It is to be understood, however, that the machine 20 could be constructed as an integral piece of farm machinery unto itself (not shown) instead of as an attachment, if desired.

The harvesting machine 20 has a sloping bed 32 which extends forwardly and downwardly from the front end of the vehicle 22. The bed 32 is formed in part of stationary frame members indicated generally by 34 (the elements of which are indicated by members 34a, 34b, 34c, 34d, 34e, 34f, and 34g) (Figs. 1, 2, 3, 4, 7 and 8) which are attached to the vehicle 22, and in part of movable frame members indicated generally by number 35 (Fig. 8) supported on the stationary members 34. The movement of the movable frame 35 on the stationary frame 34 will be more fully described hereinafter. A wheel 36 supports the bed 32 for movement over the ground ahead of the vehicle 22.

Two spaced triangular walls 38 extend upwardly and forwardly from the bed 32 (Figs. 1, 3 and 8). The edges of the walls 38 are reinforced by angle beams 40, 42 and 43, and the forward edge of each wall 38 is perpendicular to the bed 32. The beams 40 are attached to the rearward edges of the walls 38 and their upper ends are bent forwardly to support a curved guide plate or crop retarding shield 44 therebetween. A rear wall 45 is also fastened between the rear edges of walls 38.

Two rotatable gathering members 46 are mounted in upstanding position near the forward end of the bed 32. The gathering members 46 are mounted perpendicularly to the bed 32 ahead of the walls 38 and they lean forwardly so that their upper ends extend ahead of their lower ends. The gathering members 46 are mounted on shafts 48 to the movable portion 35 of the bed 32, and the shafts 48 have sprocket wheels 50 attached near their lower ends. The shafts 48 are rotatably mounted between the movable portion 35 of the bed 32 at their lower ends and the forward bent over portions 51 of the angle beams 40 at their upper ends.

The gathering members 46 include support members 52 attached near the lower ends of the shafts 48 and inflated bag-like portions 54 which extend upwardly therefrom. The bag-like portions are preferably constructed of a resilient, yieldable or flexible and air tight material such as rubber or plastic and are inflated to a relatively low pressure. It is contemplated, however, that many other constructions for the bag-like portions 54 could be used. For example, the bag-like portions 54 could be constructed of canvas, of stacked inflated inner tubes, of spongy material, or of any other suitable resilient material. In the embodiment shown, the bag-like portions 54 are constructed of a rubber or plastic base material which is sealed against loss of air and inflated to the desired pressure. The bag-like portions 54 are inflated to relatively low pressure so that they can draw stalks of crops between them without crushing the crop.

In practice, it has been found desirable to construct the bag-like portions 54 with a diameter of approximately 16 inches. This dimension produces very satisfactory operation and also enables a plurality of similar harvesting devices to be ganged together for harvesting more than one crop row at a time.

The upper ends of the shafts 48 carry cone shaped members 56 which extend upwardly from the bag-like portions 54 to the support portions 51. The cone members 56 may seal the upper ends of the bag-like portions 54 or they may simply provide support for the upper ends of the bag-like portions 54. In either case, the cone shaped members 56 are spaced from each other and facilitate entrance into the apparatus 20 of the upper ends of the stalks.

Attached to the shafts 48 below the sprockets 50 (Figs. 4 and 5) are circular rotating cutting knives 58. The diameter of the knives 58 is large enough so that the knives overlap and provide a continuous cutting action. Below and to the rear of overlapping portions of the knives 58 is mounted a grass and weed cutting member 59 (Figs. 4 and 5). The member 59 is mounted on the stationary frame member 34b and bears (at an angle) against the underside of the knives 58 to hold the knives engaged and to cut the tops off grass and weeds and prevent them from clinging onto the operating parts of the apparatus 20.

The sprocket wheels 50 and the shafts 48 are rotated by continuous link chains 60 which extend rearwardly therefrom and operatively engage other sprocket wheels 62 near the upper end and rear of the bed 32. The sprockets 62 drive the chains 60 and are mounted on shafts 64 (Fig. 7) which extend downwardly through the bed 32. The lower ends of shafts 64 carry bevel gears 66 which are meshed at right angles with other bevel gears 68 mounted on opposite ends of a horizontal shaft 70. The shaft 70 carries a sprocket 72 which is operated by another link chain 74, and the chain 74 extends forwardly therefrom around another sprocket 76 which is driven by suitable means such as shaft 78, pulleys 80, 82 and 84, belts 86 and 88, and a power source (not shown) in the vehicle 22 (Fig. 2).

The link chains 60, which drive the gathering members 46 and the knives 58, are provided with a plurality of spaced outwardly projecting wing elements 90. Since both chains 60 are driven by the shaft 70 as shown in Fig. 7, the chains 60 move in opposite directions, the upper chain 60 (as shown in Figs. 2 and 4), moving clockwise, and the lower chain 60 moving counterclockwise. Therefore, the wing elements 90 on both chains travel rearwardly on their adjacent spans and forwardly on their outer spans. Furthermore, the two triangular walls 38 are positioned between the inner and outer spans of each chain 60 so that the inner spans move between the walls 38 and the outer spans move outside of the walls 38.

The movement of the chains 60 rotates the gathering members 46 and the knives 58 so that the top gathering member 46 and the top knife 58 rotate clockwise (Fig. 2), and the bottom gathering member 46 and the bottom knife 58 rotate counterclockwise. Therefore, objects coming between the bag-like portions 54 are moved rearwardly into the apparatus 20.

The forward edge of each wall 38 (adjacent to the gathering members 46) is provided with a shield 92 (Figs. 2 and 6). The shields 92 rub against the bag-like portions 54 and prevent crop stalks from clinging to the gathering members 46 and possibly being thrown sidewise and lost.

As previously described, the bed 32 of the machine 20 is constructed having the stationary portion 34 and the movable portion 35. The gathering members 46, the knives 58, the chains 60, and the walls 38 are mounted on the movable portion 35 and are able to move sidewise in both directions in order to be in the best possible position to handle crop stalks which may have been planted out of line in their row. To facilitate sidewise angular movement of the movable frame portion 35 relative to the stationary frame 34, the movable frame portion 35 is pivotally mounted on the stationary frame portion 34 by a pivot stud or shaft 94 located near the rear of the machine 20 (Figs. 2, 3, and 4). The amount of sidewise movement of the movable frame 35 is limited as will be shown hereinafter so that the motor chain connections are not overly strained.

The movable bed portion 35 also has a flat table portion 96, which is braced with beams 98. The beams 98 extend thereunder the length of the machine 20, and the forward ends of the beams 98 are curved upwardly to enable them to move over the ground more easily. The flat portion 96 of the movable bed 35 provides a platform over which the chains 60 and wing elements 90 move to drag the crop stalks rearwardly.

The forward ends of the beams 98 carry tapered guide members 100. The guide members 100 engage out-of-line crop stalks and move the movable bed portion 35 sidewise to compensate for the misalignment and to assure that the out-of-line stalk is properly fed between the gathering members 46 and the knives 58. Flat plates 101 are mounted to the rear of the guide members 100 and prevent grass and weeds from entering the machine.

Centering springs 102 are mounted between upright posts 104 on the stationary bed 34 and the movable beams 98 (Figs. 1, 3, 4 and 9). The springs 102 constantly center the movable bed 35 relative to the stationary bed 34.

Spaced sprockets 106 and 108 (Fig. 3) are mounted above the rear portion of the movable bed 35 on shafts 109 and 111 respectively which are supported in suitable bearings in the cover member 113 (Fig. 1) and a continuous link chain 110 is mounted on the sprockets 106 and 108. The chain 110 has a plurality of spaced outwardly projecting elements 112 thereon which move in a clockwise direction and assist the wing elements 90 in moving severed stalks into the vehicle 22.

Mechanism is also mounted under the bed 32 for raising and lowering the machine 20 from an operating position as shown in Figs. 1 and 3 to a position in which the forward end of the machine is raised as when turning corners at the end of a row, when towing the machine 20 from one place to another, or for cutting the crop higher up. The mechanism for raising and lowering the machine 20 consists of an hydraulic cylinder 114 with suitable fluid conduits 114a and 114b connected to both ends thereof, a piston and rod assembly 116 movably mounted in the cylinder 114 and operatively connected to the framework of bed 32 by a pivoted rocker arm 118, and a bell crank 120. When fluid pressure is applied at the right end of the cylinder 114, the arm 118 moves clockwise and raises the machine 20, and when fluid pressure is applied at the left end, the machine 20 lowers.

*Operation*

The machine 20 is attached to the front end of the vehicle 22, and the vehicle 22 is towed down the crop rows with the forwardly projecting guide members 100 moving on opposite sides of the row. As the machine approaches a stalk which is in line in its row, the forwardly overhanging upper portions of the gathering members 46, and particularly the bag-like portions 54, engage and draw the upper part of the stalk into the machine 20. The gathering members 46 preferably rotate at a speed greater than the speed of the machine 20, and therefore, when the upper portions of the gathering members 46 draw in the upper portion of the stalk, a certain amount of pulling force is exerted on the stalk which means that the stalk is firmly held and has been advanced partly into the machine 20 by the time the lower end of the stalk is severed by the knives 58. The bag-like portions 54 are readily yieldable being preferably inflated to low pressure or constructed of readily yieldable resilient material so that the stalks deform the portions 54 and are not crushed thereby.

As the stalks move into the machine between the gathering members 46, the upper ends of the stalks move against the curved guide plate 44 and the rear wall or roof 45 and are retarded. The upper portions of the stalks are retarded by the curved guide plate 44 so that the stalks will all be fed bottom end or butt first into the vehicle 22.

Once the stalk is severed from the ground, the bottom end falls on the flat portion or platform 96 and is dragged rearwardly by the wing elements 90.

A hood 122 (Fig. 3) is also shown attached to the rear of the walls 38 to provide increased clearance for the stalks above the bed 32 as they move rearwardly. The hood 122 also provides increased exposure of the rearwardly moving stalks to the feeder chain 110 which in combination with the wing elements 90 moves the stalks rearwardly.

If an out-of-line stalk is encountered by the machine 20 the appropriate guide member 100 shifts the movable bed 35 sidewise and the stalk is fed into the machine 20 in the same manner described above.

The machine is shown and described as providing front to rear feeding of crops into a known farm vehicle. It is contemplated, however, that simple deflector means could readily be provided to turn the stalks at an angle as they enter the vehicle if this is found to be desirable. This is not shown.

Furthermore, while the present invention has been shown and described as an attachment to be used with known farm equipment, its construction is equally well suited for adaptation as an integral piece of equipment. Still further, the drawings included with this specification show the application of the machine to corn harvesting. It is not the intention, however, to limit the machine to the harvesting of corn since its principles of operation are equally applicable for use with other types of standing row crops.

Thus, it is apparent that there has been provided a novel harvesting machine for row crops which fulfills all of the objects and advantages sought therefor. It is to be understood, however, that the foregoing description and the accompanying drawings have been presented only by way of illustration and example, and that changes and alterations in the present disclosure which will be readily apparent to one skilled in the art, are contemplated as being within the scope of the present invention which is limited only by the claims which follow.

What I claim is:

1. A corn harvesting machine including a frame having a receiving bed for harvested corn, means on said frame spaced rearwardly from the front end of said bed and extending upwardly to provide a collecting space for harvested corn, said means being open toward said front end, gathering means operably mounted upon said bed at the open end of the collecting space comprising a pair of rotatable members of generally cylindrical and elongated form extending upwardly and inclined forwardly, said members having yielding surfaces in adjacent relation over the greater part of the length thereof, drive means on said frame connected to said gathering means to rotate the rotatable members whereby the adjacent surfaces move rearwardly, and cutting means operably associated with said gathering means.

2. A corn harvesting machine including a frame having a receiving bed for harvested corn, said bed having a front end lower than other portions rearwardly thereof, means on said frame spaced from the front end of said bed and extending upwardly to provide a collecting space for harvested corn, said means being open toward said front end, gathering means operably mounted upon said bed at the open end of the collecting space comprising a pair of rotatable members of generally cylindrical and elongated form extending upwardly and inclined forwardly, said members having yielding surfaces in adjacent relation over the greater part of the length thereof, drive means on said frame connected to said gathering means to rotate the rotatable members in directions moving the yielding adjacent surfaces such that corn being harvested is engaged therebetween and moved thereby into the machine between said pair of rotatable members and released in said collecting space, the forwardly inclined position of said gathering means enabling said rotatable members to engage the corn near the tops and progressively work down on the corn toward the root as the corn moves rearwardly therebetween, and cutting means operably associated with said gathering means.

3. A corn harvesting machine including a frame having a receiving bed for harvested corn, means on said frame spaced rearwardly from the front end of said bed and extending upwardly to provide a collecting space for harvested corn, said means being open toward said front end, gathering means operably mounted upon said bed at the open end of the collecting space comprising a pair of rotatable bag-like members of substantially cylindrical and elongated form inflated to a relatively low pressure and extending upwardly and inclined forwardly, said members having yielding surfaces in adjacent relation over the greater part of the length thereof, drive means on said frame connected to said gathering means to rotate the rotatable members whereby the adjacent surfaces move rearwardly, and cutting means operably associated with said gathering means.

4. A corn harvesting machine including a frame having a receiving bed for harvested corn, means on said frame spaced rearwardly from the front end of said bed and extending upwardly to provide a collecting space for harvested corn, said means being open toward said front end, gathering means operably mounted upon said bed at the open end of the collecting space comprising a pair of rotatable members of generally cylindrical and elongated form extending upwardly and inclined forwardly, said members having yielding surfaces in adjacent relation over the greater part of the length thereof, a cone-like element positioned adjacent to the upper end of each of said rotatable members, drive means on said frame connected to said gathering means to rotate the cone-like elements and rotatable members whereby the adjacent surfaces move rearwardly, and cutting means operably associated with said gathering means.

5. A corn harvesting machine including a frame having a receiving bed for harvested corn, means on said frame spaced rearwardly from the front end of said bed and extending upwardly to provide a collecting space for harvested corn, said means being open toward said front end, gathering means operably mounted upon said bed at the open end of the collecting space comprising a pair of rotatable members of generally cylindrical and elongated form extending upwardly and inclined forwardly, said members having yielding surfaces in adjacent relation over the greater part of the length thereof, drive means on said frame connected to said gathering means to rotate the rotatable members whereby the adjacent surfaces move rearwardly, crop retarding means secured to the upper portion of said frame means rearwardly of said gathering means, and cutting means operably associated with said gathering means.

6. A corn harvesting machine including a frame having a receiving bed for harvested corn, means on said frame spaced rearwardly from the front end of said bed and extending upwardly to provide a collecting space for harvested corn, said means being open toward said front end, gathering means operably mounted upon said bed at the open end of the collecting space comprising a pair of rotatable members of generally cylindrical and elongated form extending upwardly and inclined forwardly, said members having yielding surfaces in adjacent relation over the greater part of the length thereof, drive means on said frame connected to said gathering means to rotate the rotatable members whereby the adjacent surfaces move rearwardly, conveying means extending rearwardly from said gathering means into said collecting space adjacent to said receiving bed and operably connected to said gathering means, and cutting means operably associated with said gathering means.

7. A corn harvesting machine including a stationary frame having front and rear ends, a movable receiving bed for harvested corn having a pivotal connection with said stationary frame adjacent the rearward end thereof, spring means between said stationary frame and receiving bed adjacent to the forward ends thereof for maintaining a centered relationship therebetween, spaced apart side walls positioned on said bed rearwardly from the front end thereof, said side walls extending upwardly and with said bed defining a collecting space having an open front end for receiving harvested corn, gathering means operably mounted upon said bed at the open end of the collecting space comprising a pair of rotatable members of generally cylindrical and elongated form extending upwardly and inclined forwardly, said members having yielding surfaces in adjacent relation over the greater part of the length thereof, drive means on said bed connected to said gathering means to rotate the rotatable members whereby the adjacent surfaces move rearwardly, and cutting means operably associated with said gathering means.

8. A corn harvesting machine including a stationary frame having forward and rearward ends, a movable receiving bed having a pivotal connection with said frame adjacent to the rearward end thereof, spring means between said frame and bed adjacent to the forward ends thereof for normally maintaining a centered relationship therebetween, spaced means on said bed spaced rearwardly from the front end thereof and extending upwardly to form a collecting space having an open front end for receiving harvested corn, gathering means operably mounted upon said bed at the open end of the collecting space comprising a pair of rotatable members of substantially cylindrical and elongated form extending upwardly and inclined forwardly, said members having yieldable surfaces in adjacent relation over the greater part of the length thereof, guide members on said bed projecting forwardly from said gathering means and having converging surfaces directed toward the adjacent surfaces of said rotatable members, said guide means being adapted to move the front end of said bed laterally relative to said frame about the pivotal connection therebetween for substantially aligning said adjacent surfaces of said rotatable members with corn to be harvested, drive means on said bed connected to said gathering means to rotate the rotatable members whereby said adjacent surfaces move rearwardly to move corn into said collecting space, and cutting means operably associated with said gathering means.

9. A corn harvesting machine including a frame having a receiving bed for harvested corn, means on said frame spaced rearwardly from the front end of said bed and extending upwardly to form a collecting space for harvested corn, said means being open toward said front end, gathering means operably mounted on said bed at the open end of the collecting space comprising a pair of rotatable bag-like members of generally cylindrical and elongated form inflated to a relatively low pressure and extending upwardly and inclined forwardly, said members having yieldable surfaces in substantially continuous line contact over the greater part of the length thereof, a cone-like element positioned adjacent to the upper end of each of said rotatable members defining an upwardly enlarging passage, drive means on said frame connected to said gathering means to rotate the rotatable members and cone-like elements, crop retarding means secured to the upper portion of said frame means rearwardly of said gathering means, conveying means extending rearwardly from said gathering means into said collecting space and adjacent to said bed, said conveying means including spaced continuous chains having a plurality of spaced wing elements and having a driven connection with said drive means, and cutting means operably associated with said gathering means.

References Cited in the file of this patent
UNITED STATES PATENTS

| | | |
|---|---|---|
| 125,318 | McLeish | Apr. 2, 1812 |
| 2,188,522 | Alfs | Jan. 30, 1940 |
| 2,458,299 | Powers | Jan. 4, 1949 |
| 2,477,794 | Gehl | Aug. 2, 1949 |
| 2,641,890 | Baird | June 16, 1953 |
| 2,657,513 | Martin | Nov. 3, 1953 |
| 2,760,325 | Witt | Aug. 28, 1956 |